United States Patent
Lin et al.

(10) Patent No.: US 8,107,382 B2
(45) Date of Patent: Jan. 31, 2012

(54) LOOP DETECTION IN A COMMUNICATIONS NETWORK

(75) Inventors: Chuh Yu Lin, San Jose, CA (US); Roger Lapuh, Uesslingen (CH)

(73) Assignee: Avaya Holdings Limited, Basking Ridge, NJ (US)

( * ) Notice: Subject to any disclaimer, the term of this patent is extended or adjusted under 35 U.S.C. 154(b) by 1502 days.

(21) Appl. No.: 11/394,816

(22) Filed: Mar. 31, 2006

(65) Prior Publication Data

US 2007/0230357 A1    Oct. 4, 2007

(51) Int. Cl.
H04L 12/26    (2006.01)

(52) U.S. Cl. ............................. 370/244; 370/254

(58) Field of Classification Search ............. 370/241, 370/242–245, 254–258
See application file for complete search history.

(56) References Cited

U.S. PATENT DOCUMENTS

| | | | |
|---|---|---|---|
| 5,946,679 A * | 8/1999 | Ahuja et al. ................. | 707/3 |
| 6,857,027 B1 * | 2/2005 | Lindeborg et al. ............ | 709/239 |
| 2003/0097470 A1 * | 5/2003 | Lapuh et al. ................. | 709/239 |
| 2005/0076140 A1 * | 4/2005 | Fung ............................ | 709/245 |
| 2006/0013141 A1 * | 1/2006 | Mutoh et al. ................. | 370/241 |

OTHER PUBLICATIONS searchNetworking.com Definitions, definition for "Spanning Tree Protocol," http://searchnetworking.techtarget.com/sDefinition/0,,sid7_gci214602,00.html, pp. 1-3 (at least as early as Feb. 16, 2006).
NetworkWorld Research Center, definition for "VLAN (virtual LAN)," http://www.networkworld.com/details/471.html, pp. 1-4 (at least as early as Feb. 16, 2006).
UCDavis Network 21, "VLAN Information," http://net21.ucdavis.edu/newvlan.html, pp. 1-13 (at least as early as Feb. 16, 2006).
Appendix C, "Understanding Spanning-Tree Protocol," pp. C1-C12 (dated before Mar. 2006).
Nortel Networks, "Passport 8600 Split Multi-Link Trunking Frequently Asked Questions," pp. 1-4 (2002).
Webopedia, definition for "Spanning Tree Protocol," http://www.webopedia.com/TERM/S/spanning_tree_protocol.html, pp. 1-3 (at least as early as Feb. 16, 2006).

* cited by examiner

*Primary Examiner* — Pao Sinkantarakorn
(74) *Attorney, Agent, or Firm* — Trop Pruner & Hu, P.C.

(57) ABSTRACT

A first node includes ports and a controller to receive a test packet at a first one of the ports. The first node determines whether the received test packet has a destination address that matches one or more predefined addresses associated with a second node. Presence of a loop in a communications network in which the first and second nodes are located is indicated in response to detecting receipt of the test packet containing the matching destination address.

22 Claims, 3 Drawing Sheets

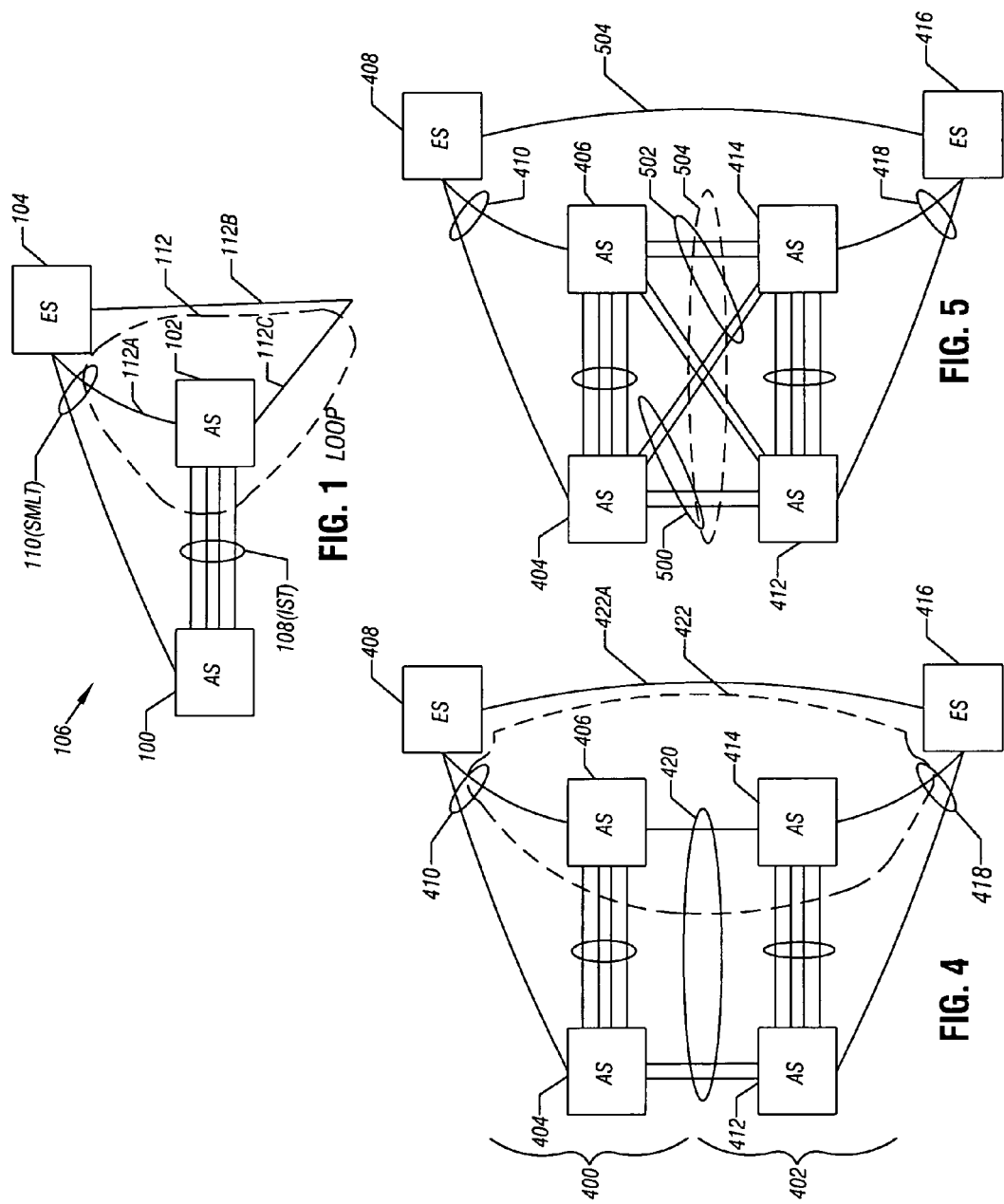

LOOP DETECTION IN A COMMUNICATIONS NETWORK

TECHNICAL FIELD

The invention relates generally to loop detection in a communications network.

BACKGROUND

In many enterprises (e.g., companies, governmental organizations, educational or research organizations, and so forth), communications networks are implemented to enable the transport of information among users and devices. Examples of such networks include local area networks (LANs), wide area networks, the Internet, and so forth.

Communications networks typically include switching nodes (such as Ethernet switches) that are able to receive packets, read the target address of each received packet, and forward each packet to the appropriate port associated with the target network segment. A switching node (or more simply "a switch") provides switching at the physical and data link layers of the OSI (open systems interconnection) reference model. Switching at layers 2 and 3 of the OSI reference model involves a combination of switches and routers, with the routers making network- and transport-level decisions relative to establishment of a network path.

To reduce the likelihood of failures of communications networks, communications networks often use failure management schemes that are able to overcome points of failure within the communications networks. The failure management schemes allow re-routing around points of failure in the communications networks. In layer 2, this can be accomplished by building a loop-free topology, such as by using techniques described in IEEE (Institute of Electrical and Electronics Engineers) 802.1D or other techniques.

However, in some communications networks with failure management schemes, loops can occur, where a loop results from a combination of one or more network paths (and any nodes in those one or more network paths) that cause one network node to be connected back to itself through the combination of one or more network paths (and any nodes in those one or more network paths). The presence of loops may cause various issues in communications networks, including flooding of the networks with multicast or broadcast packets.

SUMMARY

In general, according to an embodiment, a method comprises transmitting, from a logical switch made up of at least two switching nodes, a test packet to a communications network, and detecting receipt of the test packet by at least one of the switching nodes in the logical switch. Presence of a loop in the communications network is indicated in response to detecting receipt of the test packet by the at least one switching node.

Other or alternative features will become apparent from the following description, drawings, and from the claims.

BRIEF DESCRIPTION OF THE DRAWINGS

FIG. 1 is a block diagram of an example arrangement of network nodes, where at least one of the network nodes has the capability of detecting a loop in a communications network in accordance with an embodiment.

FIGS. 4-5 are block diagrams of alternative arrangements of network nodes, in which at least one of the network nodes has the capability of detecting a loop in a communications network, according to an embodiment.

DETAILED DESCRIPTION

Figure 6:
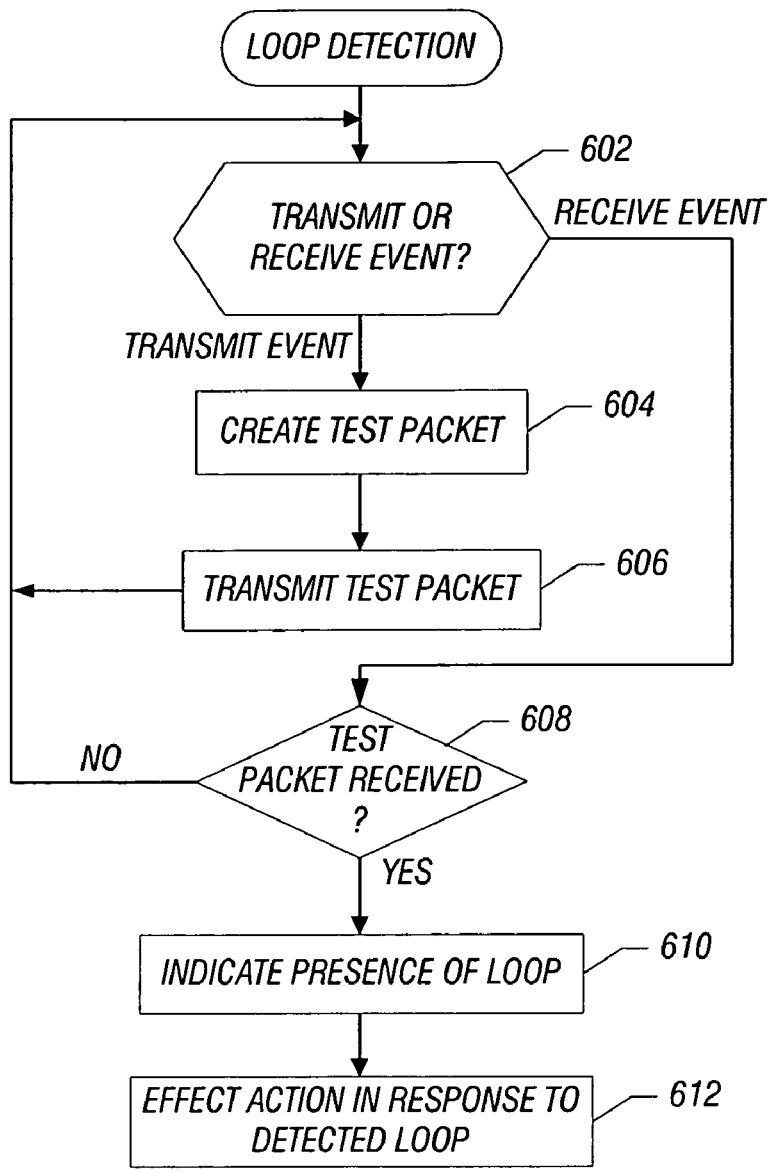
FIG. 6 is a flow diagram of a process of performing loop detection, in accordance with an embodiment.

FIG. 1 illustrates an example arrangement of a communications network 106 that includes various network nodes 100, 102, and 104. In the example arrangement of FIG. 1, network nodes 100, 102, and 104 are switching nodes (or more simply switches). The switching node 104 is an edge switch (ES) for coupling an end station (such as a customer premise equipment (CPE) device or other type of device) to switching nodes 100 and 102. An edge switch is located at the edge of a network to which end stations are directly or indirectly (e.g., through a hub or another switch) connected. The switching nodes 100 and 102 are aggregation switches (AS). The aggregation switches 100 and 102 connect to multiple edge switches or even to end stations.

The aggregation switches 100 and 102 can be considered central switches for switching between or among edge switches or end stations. The aggregation switches 100 and 102 are connected by an inter-switch trunk (IST) 108, which includes one or more parallel point-to-point links. The aggregation switches 100 and 102 utilize the inter-switch trunk 108 to share information so that the pair of aggregation switches may operate as a single logical switch. The aggregation switches 100, 102 in the pair are considered peers of each other.

The FIG. 1 arrangement is provided for the purpose of example. In other embodiments, aggregation switch pairs that provide a single logical switch are not implemented. Also, the distinction between aggregation and edge switches can be omitted, with the network having multiple switches of the same type. Also, there may be other network nodes that are part of the communications network 106 that are not depicted in FIG. 1.

According to some implementations, the architecture of FIG. 1 is a split multilink trunking (SMLT) architecture, such as the SMLT architecture provided by Nortel Networks Limited. The SMLT architecture provides a failure management scheme in which re-routing around points of failure in the communications network 106 can be accomplished. A multilink trunk (MLT) is a communications channel having multiple parallel point-to-point communications links that connect two switches, where the multilink trunk aggregates multiple ports of the switches so that the ports logically behave as a single port with aggregated bandwidth. A standard describing MLT is the IEEE (Institute of Electrical and Electronics Engineers) 802.3ad standard.

In the example of FIG. 1, a split multilink trunk (SMLT) 110 is used which is basically a multilink trunk that is split between a pair of aggregation switches (in the example of FIG. 1, aggregation switches 100 and 102). The SMLT 110 connects the aggregation switches 100, 102 to the edge switch 104. The edge switch 104 is unaware that the MLT is split at the aggregation switch pair side. Further details regarding SMLT can be found in U.S. Publication No. 2003/0097470, entitled "System, Device, and Method for Improving Communication Network Reliability Using Trunk Splitting," filed on Apr. 28, 2002, by Roger Lapuh et al.

In other embodiments, other types of network architectures can be used. Moreover, "switching nodes" (or more simply "switches") are intended to cover either layer 2 switches or layers 3 and/or 4 routers.

As depicted in FIG. 1, there is a possibility that a loop 112 is present in the communication network 106. If proper connections were made in the communications network among the various network nodes during network setup, then the loop 112 should not be present. However, during communications network setup, service personnel may make improper connections that result in the presence of the loop 112 (or even multiple loops). As depicted in FIG. 1, the loop 112 includes three network path segments 112A, 112B, and 112C. The presence of a loop may cause failures or other problems to occur in the communications network 106, such as flooding of broadcast or multicast packets in which a large number of packets are communicated in the loop that can overwhelm network nodes in the communications network 106.

In accordance with some embodiments, at least some of the network nodes of the communications network 106 are capable of determining whether the loop 112 (or more than one loop) is present in the communications network 106. Loop detection is accomplished by a network node, such as the switching node 102, sending a test packet out onto the communications network, where the destination address specified in the test packet is the address of the switching node 102 that transmitted the test packet. After transmitting the test packet, the switching node 102 is able to detect receipt of the test packet at the switching node 102. In some embodiments, the test packet is sent from a first port of the switching node 102, and received at a second port of the switching node 102. In other embodiments, the test packet can be transmitted and received at the same port. Receipt of the test packet transmitted by the same switching node 102 means that a loop is present in the communications network. In response to detection of the loop, an action is taken to remove the loop, such as by disabling one or more ports of the switching node 102.

In another scenario, a test packet transmitted by a first switching node in an aggregation switch pair (e.g., switching node 100) is received by a second switching node (e.g., switching node 102) in the aggregation switch pair. Because the two switching nodes 100 and 102 are considered a single logical switch in the FIG. 1 embodiment, this test packet path (test packet sent and received by different switching nodes of the same switch pair) is also indicative of presence of a loop. In this scenario, the presence of loop segments 112B and 112C is not even required to result in a loop condition. Normally, if the edge switch 104 is properly configured, a packet received by one port of the edge switch 104 from an aggregation switch pair will not be transmitted by the edge switch 104 through another port of the edge switch 104 back to the same aggregation switch pair. However, if the edge switch 104 is improperly configured (incorrect configuration or lost configuration), then routing of a packet received from an aggregation switch pair back to the aggregation switch pair may occur.

An example of a mis-configuration at the edge switch 104 that can cause this behavior includes lost configuration at the edge switch 104 such that the ports of the edge switch 104 connected to the aggregation switch pair are no longer configured as MLT ports. Since plural MLT ports at the edge switch 104 to the aggregation switch port behave as a single logical port, the edge switch 104 will not forward a received packet back out over the logical port at which the packet was received. However, if the MLT configuration is lost such that the plural ports between the edge switch 104 and the aggregation switch port are no longer MLT ports, then the plural ports will become distinct ports. Because the ports are distinct ports, the edge switch 104 may route a packet received at one of the ports to another one of the ports, which will cause the packet to be returned to the same aggregation switch pair that transmitted the packet.

Figure 2:
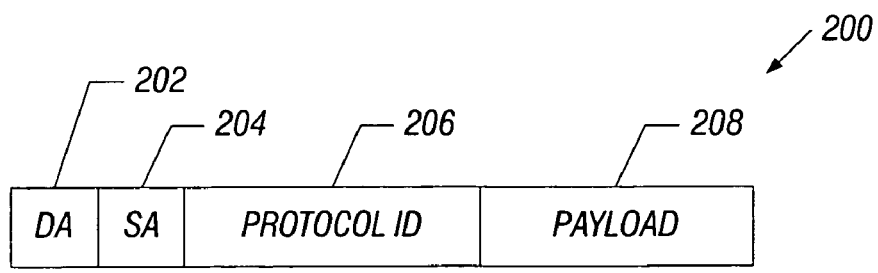
FIG. 2 illustrates a test packet according to an embodiment used for detecting a loop in the communications network.

FIG. 2 shows a test packet 200 according to an embodiment. In the example of FIG. 2, the test packet is referred to as a simple loop prevention protocol (SLPP) packet data unit (PDU), which has several fields, including a destination address (DA) field 202, a source address (SA) field 204, a protocol identifier (ID) field 206, and a payload field 208. In some embodiments, each of the destination address field 202 and source address field 204 contains a medium access control (MAC) address, which is a hardware address that uniquely identifies each node of a network. MAC addresses are defined for the MAC sublayer of layer 2 of the OSI reference model. In other embodiments, other types of node addresses can be specified in the address fields 202 and 204.

The destination address field 202 specifies the address of the destination to which the test packet 200 is to be sent, while the source address field 204 contains the address of the sender. According to some embodiments, both the destination address field 202 and the source address field 204 identify the same switching node (the node that transmitted the test packet). In some implementations, the destination address field 202 can be the address of the transmitting switching node plus a multicast bit that is set to indicate that the test packet 200 is being multicast so that the test packet can be sent through multiple switching nodes within the same virtual local area network (VLAN). A VLAN refers to a virtual network of devices that are actually located on different physical LAN segments, but which devices can communicate with each other as if the devices were on the same physical LAN segment. In embodiments in which multiple VLANs are implemented in the communications network 106, a test packet can traverse through network nodes within the same VLAN, but the test packet is not forwarded to other VLAN(s). Note, however, in other embodiments, VLANs are not implemented in the communications network 106.

The protocol ID field 206 identifies that SLPP is being used and thus the packet 200 is an SLPP PDU (a test packet). More generally, the field 206 contains information that provides an indicator that the packet 200 is a test packet. The payload field 208 contains several subfields, including a subfield to indicate a version of SLPP that is used, and subfields to indicate the identifier of the VLAN in which the transmitting network node is located (if VLANs are implemented in the communications network 106).

The fields provided in the SLPP PDU 200 depicted in FIG. 2 are for purposes of example. In different embodiments, other fields can be contained in a test packet sent from a network node for detecting loops in a communications network. Also, if VLAN is not implemented, then the payload field 208 would not include VLAN identifier subfields.

Figure 3:
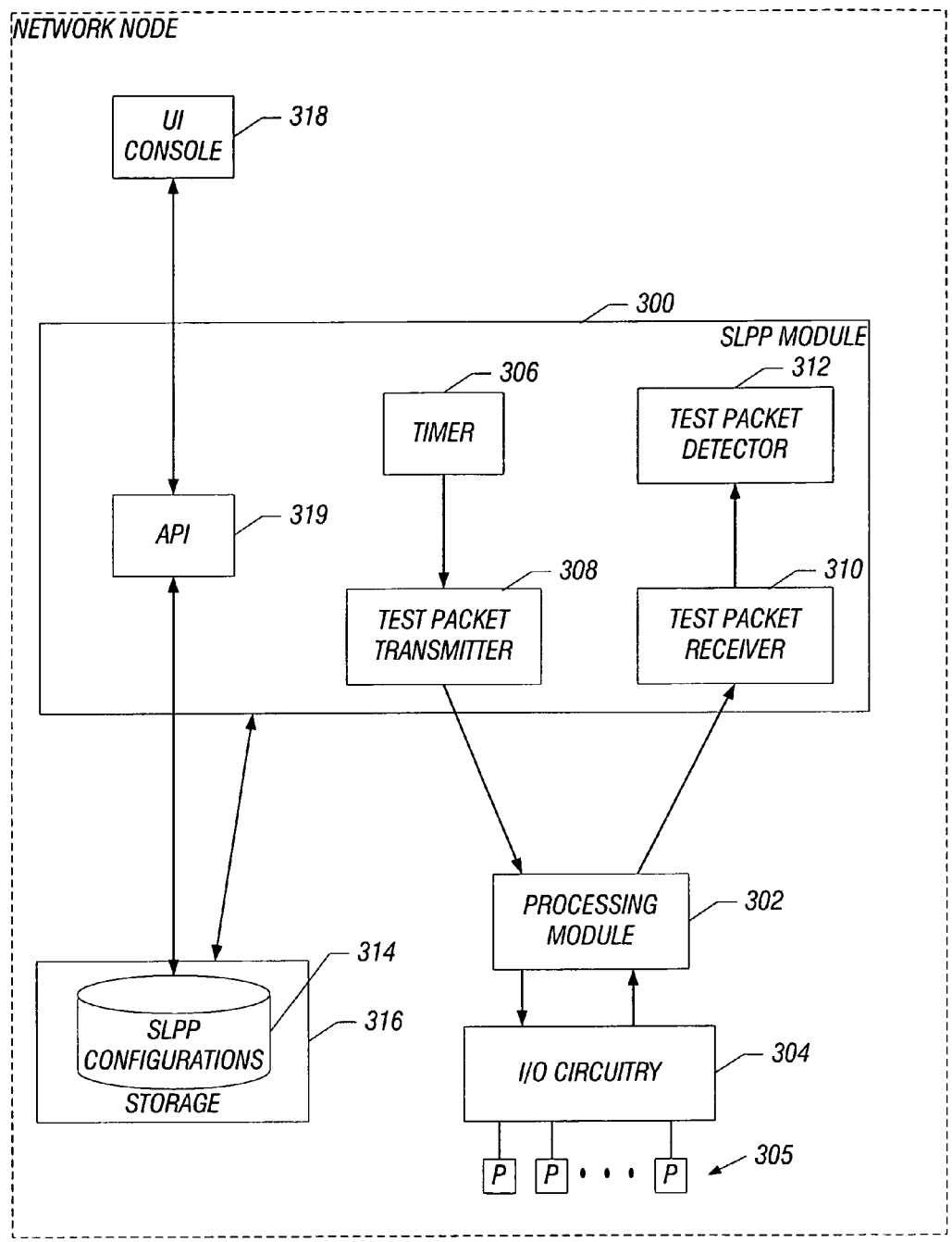
FIG. 3 is a block diagram of a switching node used in a communications network, where the switching node has components for detecting a loop in the communications network, in accordance with an embodiment.

FIG. 3 is a block diagram of components in a network node (such as a switching node) that is capable of sending the test packet 200 of FIG. 2. In FIG. 3, an SLPP module 300 (which can be implemented as a software module or plural software modules) is executable on a processing module 302 (which can include one or multiple central processing units or CPUs). The processing module 302 is coupled to input/output (I/O) circuitry 304 that is connected to ports 305 to various links of the communications network 106 (FIG. 1). The ports 305 are basically interfaces (software and/or hardware interfaces) to respective links of the communications network 106. Note that in embodiments in which multiple VLANs are implemented, different ones or combinations of the ports 305 can be assigned to different VLANs. For example, a first group of one or more ports 305 can be assigned to VLAN 1, a second group of one or more ports 305 can be assigned to VLAN 2, and so forth. The SLPP module 300 is capable of sending test packets 200 through the I/O circuitry 304 and respective ports 305 to the communications network 106.

The SLPP module 300 has a timer 306 for timing when test packets are to be transmitted. The intervals at which test packets are sent can correspond to a specific period (such as one test packet every few seconds, minutes, or other periods), or the intervals between transmission of test packets can vary or be triggered by some specified event. Test packets are sent by a test packet transmitter 308, which generates each test packet that is sent by the processing module 302 through the I/O circuitry 304 and ports 305 to the communications network. Upon each occurrence of expiration of the timer 306, test packets can be sent to all VLANs in a transmit list through respective ports 305. The transmit list is basically a list of VLANs to which test packets are to be sent upon expiration of the timer 306 (or other specified event).

In some implementations, sending test packets to selected VLANs (rather than to ports) allows for enhanced scalability while maintaining flexibility in detecting loops on any particular VLAN. Since each port can have many assigned VLANs, sending test packets to selected ports can result in large numbers of test packets sent from a switching node, which can affect scalability of the processing components (e.g., CPUS) in the processing module. By sending test packets to VLANs rather than to ports in some implementations, the loop detection technique is made to be more lightweight (in other words, less burden is placed on the processing capacity of a switching node).

The SLPP module 300 also includes a test packet receiver 310 to receive test packets (which have been received at a port or plural ports of the network node and forwarded through the I/O circuitry 304 and processing module 302 to the SLPP module 300). A test packet detector 312 detects receipt of such a test packet by the test packet receiver 310. The test packet detector 312 and test packet receiver 310 will also determine which port(s) 305 to disable based on detection of a loop (or plural loops).

The configurations of the SLPP module 300 can be specified in a SLPP configurations database 314, which is stored in a storage 316 of the network node. The SLPP configurations database 314 can be updated or set by a user interface console 318 through an interface (e.g., application programming interface or API 319 of the SLPP module 300). The user interface console 318 can be part of the network node or can be located remotely from the network node of FIG. 3. A user, through the user interface console 318, is able to specify various configurations associated with the SLPP module 300, such as the interval(s) for the timer 306, the port at which the test packet transmitter 308 is to transmit a test packet for each particular VLAN, the port at which the test packet receiver 310 is to receive a test packet for each particular VLAN, the transmit list of VLANs, an SLPP receiving port table that contains counts of received test packets at each port that would cause port disabling, and other configurations. The SLPP receiving port table in the SLPP configurations database 314 specifies, for each port, how many test packets have to be received prior to disabling the respective port due to loop detection. In some cases, it is desirable not to disable a port in response to a single occurrence of receipt of a test packet, since the receipt of the test packet may have been due to a temporary network condition that may have gone away so that port disabling is not needed.

It is noted that FIG. 3 shows an example arrangement of components in a network node that is able to perform loop detection. In other embodiments, other arrangements of a network node for performing loop detection can be provided. More generally, the SLPP module 300 performs loop detection and effecting of action in response to loop detection. For SLPP modules implemented on peer switches in an aggregation switch pair, the SLPP modules have the following further capabilities: exchange addresses of the peer switches with each other (so that one switch in the switch pair can detect a loop condition in response to receipt of a test packet transmitted by the other switch in the switch pair); disable a port (e.g., an SMLT port) in response to a request from a peer SLPP module (to remove the loop condition in response to loop detection based on receipt of a test packet by the peer SLPP module); and notify the peer switch to disable a port at the peer switch.

FIG. 4 shows another arrangement of a communications network in which a loop may be present. FIG. 4 is an arrangement in which two sets of the FIG. 1 arrangement are provided, where a first set 400 includes aggregation switches 404, 406 (part of an aggregation switch pair) that are connected to an edge switch 408 over an SMLT 410, and a second set 402 that includes aggregation switches 412, 414 (part of another aggregation switch pair) that are connected to an edge switch 416 by an SMLT 418. The pair of aggregation switches 404, 406 is connected to the pair of aggregation switches 412, 414 by an MLT 420.

The arrangement of FIG. 4 is generally a square configuration, where presence of an improperly connected network segment 422A causes a loop 422 to be present in the communications network. In the arrangement of FIG. 4, each of the aggregation switches 404, 406, 412, and 414 can include an SLPP module (such as that shown in FIG. 3) for detecting the presence of a loop in the communications network.

FIG. 5 illustrates another arrangement of network nodes, which is similar to the FIG. 4 arrangement except that multiple SMLTs 500, 502 and MLT 504 are used to interconnect the aggregation switches 404, 406, 412, and 414. FIG. 5 depicts an example of a full-mesh arrangement. In the arrangement of FIG. 5, an improperly connected network segment 504 can cause a loop to be present.

As mentioned above, in other embodiments, the presence of improper network segments (such as segments 112B and 112C in FIG. 1, segment 422A in FIG. 4, and segment 504 in FIG. 5) is not needed for a loop to be present in a communications network. A loop can be caused by improperly configured switches, such as edge switches. An improperly configured switch (such as an edge switch in which ports to an aggregation switch pair have not been configured as MLT ports) will cause a test packet received from one aggregation switch pair to be returned to the same aggregation switch pair.

According to some embodiments, in each of the network arrangements in which loop detection is provided, a spanning tree protocol (STP) is not implemented. STP is a link management protocol that provides path redundancy while preventing undesirable loops in a network. Use of SLPP packets according to some embodiments thus enables loop detection that may occur due to STP not being implemented. In other embodiments, use of SLPP packets for loop detection can also be used in communications networks where STP is implemented.

FIG. 6 shows a flow diagram of the process performed by the SLPP module 300 (FIG. 3) according to an embodiment for loop detection. The SLPP module 300 first determines (at 602) if a transmit event or receive event has occurred. A transmit event refers to an event relating to transmission of a test packet, and a receive event refers to an event relating to receipt of a test packet. In response to detecting a transmit event (at 602), such as expiration of the timer 306 or other specified event, the SLPP module 300 creates (at 604) a test packet (such as the test packet 200 of FIG. 2) or plural test packets (for sending to plural VLANs as appropriate). The test packet(s) is (are) transmitted (at 606) through a particular port (or ports) of the network node depending on the content of the transmit list in the SLPP configurations database 314 mentioned above.

In response to a receive event, the SLPP module 300 determines (at 608) if a test packet having a destination address matching the address of either the transmitting node or a peer of the transmitting node has been received. If the received test packet does not have a matching destination address, then the SLPP module returns to wait for the next event. However, if the received test packet has a matching address, then the SLPP module 300 indicates (at 610) presence of a loop in the communications network. In addition, the SLPP module 300 (either by itself or in connection with some other module) (either software module or hardware module) effects (at 612) an action in response to the detected loop. One action that can be taken is to disable the port at which the test packet containing the matching address was received. In one embodiment, if the received port is a non-MLT port, then that port is disabled. On the other hand, if the received port is an MLT port that is a member of a group of other MLT ports, then the entire group of MLT ports will be disabled. As indicated above, a group of MLT ports are considered a single logical port. Similarly, if the received port is a member of a group of SMLT ports, then the entire group of SMLT ports will be disabled. Also, the SLPP module will notify the peer switch to disable the SMLT port(s) at the peer switch. The action effected at 612 can also include creating or adding to a log (or other record) to indicate which port(s) has (have) been disabled. In addition, debugging information can be written into the log (or other record), such as information pertaining to the port at which a test packet was received, an identifier of the VLAN from which the test packet was received, and an identifier of the sender from which the test packet was received.

In embodiments in which VLANs are implemented, the SLPP module 300 is able to further determine whether a loop exists in one VLAN, or whether a loop exists in multiple VLANs. The SLPP module 300 is able to retrieve the VLAN identifier information (such as from the payload field 208 of the received SLPP PDU depicted in FIG. 2) to determine the VLAN to which the SLPP PDU was sent. The SLPP module 300 is also able to determine which VLAN the SLPP module 300 received the SLPP PDU from. Based on a comparison of the VLAN identifier in the SLPP PDU and the identifier of the VLAN from the SLPP PDU was received, the SLPP module 300 (or a user) can determine whether the loop is in one VLAN or in more than one VLAN. In other words, if the VLAN identifier in the payload field 208 of the SLPP PDU is the same as the identifier of the VLAN from which the SLPP PDU was received, then the loop is considered to be in the same VLAN. On the other hand, if the VLAN identifier in the payload field 208 of the SLPP PDU is different from the identifier of the VLAN from which the SLPP PDU was received, then the loop is considered to be in multiple VLANs. Both conditions are error conditions that have to be addressed by disabling one or more ports.

As noted above, disabling of ports is in response to a user-configurable number of detections of test packets that contain a destination address matching the address of the transmitting node or the address of the peer of the transmitting node. The SLPP module keeps track of the number of test packets containing matching destination addresses that have been received at a particular port, and compares that number to the count number specified in the SLPP receiving port table in the SLPP configurations database 314. If an adequate number of test packets containing matching addresses have been received at that particular port, then disabling of that port (and all other associated ports) can be effected. Note that if the received port is an SMLT port, then the counts of the number of received test packets containing matching addresses of SMLT ports of both peer nodes are combined.

In some embodiments, a limit can also be set (such as in the SLPP configurations database 314 of FIG. 3) to indicate that only a certain number of ports of a particular network node can be disabled within some predefined period of time. This avoids a situation where too many (or even all) of the ports of a particular network node are disabled due to receipt of test packets such that the network node is completely isolated.

Instructions of various software modules (e.g., SLPP module 300 of FIG. 3) are loaded for execution on corresponding processors (e.g., processing module 302). Processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the software) are stored in respective storage devices (e.g., storage 316 of FIG. 3), which are implemented as one or more machine-readable or computer-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While some embodiments have been disclosed with respect to a limited number of embodiments, those skilled in the art will appreciate numerous modifications and variations there from. It is intended that the appended claims cover such modifications and variations as fall within the true spirit and scope of the invention.

What is claimed is:

1. A method comprising:
   transmitting, from a logical switch made up of at least two switching nodes, a test packet to a communications network;
   receiving the test packet by at least one of the switching nodes in the logical switch;
   determining whether the received test packet has a destination address that matches one or more predefined addresses associated with one of the two switching nodes, wherein determining whether the received test packet has the destination address that matches the one or more predefined addresses comprises determining whether the received test packet has the destination address that matches an address that individually identifies one of the switching nodes in the logical switch; and
   indicating presence of a loop in the communications network in response to determining that the test packet has the destination address that matches the address that individually identifies one of the two switching nodes.

2. The method of claim 1, wherein transmitting the test packet to the communications network comprises transmitting the test packet to the communications network that has an arrangement of plural switching nodes in which re-routing around failure points is enabled.

3. The method of claim 1, wherein transmitting the test packet comprises transmitting the test packet having the destination address that individually specifies the one of the switching nodes in the logical switch as a destination.

4. The method of claim 3, wherein the test packet further has a field indicating that the test packet is for loop detection, the method further comprising setting, by one of the at least two switching nodes, a value of the field prior to transmitting the test packet.

5. The method of claim 3, wherein the test packet further has a field indicating an identifier of a virtual local area network, the method further comprising setting a value of the field.

6. The method of claim 1, further comprising disabling one or more ports of the switching nodes in the logical switch in response to the indicated presence of the loop.

7. The method of claim 1, further comprising storing configuration information relating to a time period at which transmission of test packets is to be repeated.

8. The method of claim 1, wherein the determining is performed after the transmitting and the receiving.

9. The method of claim 1, wherein receiving the test packet comprises receiving the test packet that includes the destination address and a source address, the destination address to individually identify one of the switching nodes in the logical switch, and the source address to individually identify one of the switching nodes in the logical switch.

10. The method of claim 9, wherein the destination address and the source address in the received test packet are the same.

11. A first node comprising:
ports; and
a controller to:
receive a test packet at a first one of the ports, wherein the received test packet was sent by the first node or a second node, wherein the first and second nodes are part of a logical switch;
determine whether the received test packet has a destination address that matches one or more predefined addresses associated with the first node or the second node, wherein the destination address that matches the one or more predefined addresses is an address that individually identifies the first node or the second node; and
indicate presence of a loop in a communications network in which the first and second nodes are located in response to detecting receipt of the test packet containing the destination address matching the address that individually identifies the first node or second node.

12. The first node of claim 11, the controller to further send a request to the second node in response to detecting that the received test packet has a destination address that matches the one or more predefined addresses associated with the second node, wherein the request is a request to disable a port of the second node.

13. The first node of claim 11, the controller to write debugging information into a record, the debugging information including at least one of:
information pertaining to the port at which the test packet was received, an identifier of a virtual local area network from which the test packet was received, and an identifier of a sender from which the test packet was received.

14. The first node of claim 11, wherein the first node is a switching node that is part of a split multilink trunk (SMLT) architecture.

15. The first node of claim 11, the controller to disable a group of multilink trunk (MLT) ports in response to the indicated presence of the loop, wherein the first port belongs to the group of MLT ports.

16. The first node of claim 11, further comprising a storage to store a transmit list of virtual local area networks to which test packets are to be sent from the first node,
wherein the controller is configured to transmit test packets to virtual area networks indicated by the transmit list.

17. The first node of claim 11, wherein the controller is to perform the determining after receiving the test packet that was sent by the first node or the second node.

18. The first node of claim 11, wherein the test packet includes the destination address and a source address, the destination address to individually identify the first node or the second node, and the source address to individually identify the first node or the second node.

19. The first node of claim 18, wherein the destination address and the source address in the received test packet are the same.

20. An article comprising at least one non-transitory storage medium containing instructions that when executed cause a first network node to:
send a test packet to a communications network, wherein the test packet contains a source address that identifies the first network node and a destination address that identifies the first network node;
receive the test packet from the communications network;
determine whether the received test packet has a destination address that matches an address of the first network node; and
indicate presence of a loop in the communications network in response to determining that the received test packet contains the destination address that matches the address of the first network node.

21. The article of claim 20, wherein the determining is performed after the sending and the receiving.

22. The article of claim 20, wherein determining whether the received test packet has the destination address that matches the address of the first network node comprises determining whether the received test packet has the destination address that matches the address that individually identifies the first network node.

* * * * *